(12) United States Patent
Marchetti

(10) Patent No.: US 7,429,147 B2
(45) Date of Patent: Sep. 30, 2008

(54) ANTI-FLOODING DEVICE FOR THE EXPLOITATION OF WATER ENERGY

(76) Inventor: Antonio Marchetti, Via Federico Seismit-Doda, 43, Roma (IT) 00143

( * ) Notice: Subject to any disclaimer, the term of this patent is extended or adjusted under 35 U.S.C. 154(b) by 315 days.

(21) Appl. No.: 10/554,394

(22) PCT Filed: Sep. 19, 2003

(86) PCT No.: PCT/IT03/00562

§ 371 (c)(1),
(2), (4) Date: Oct. 24, 2005

(87) PCT Pub. No.: WO2004/094733

PCT Pub. Date: Nov. 4, 2004

(65) Prior Publication Data

US 2008/0008532 A1    Jan. 10, 2008

(30) Foreign Application Priority Data

Apr. 24, 2003  (IT) .......................... RM2003A0186

(51) Int. Cl.
*E02B 8/04*    (2006.01)
*E02B 9/00*    (2006.01)

(52) U.S. Cl. ............................. 405/96; 405/92; 405/80; 405/75

(58) Field of Classification Search ............. 405/75–78, 405/80, 87, 92, 103, 104, 106, 96
See application file for complete search history.

(56) References Cited

U.S. PATENT DOCUMENTS 1,582,715 A * 4/1926 Wensley ....................... 405/96
1,644,445 A * 10/1927 Pratt ............................ 405/96
1,756,596 A   4/1930 Katona
4,569,200 A * 2/1986 Lamb .......................... 405/78
4,941,771 A   7/1990 Perper

FOREIGN PATENT DOCUMENTS

DE          248 287       6/1912

* cited by examiner

*Primary Examiner*—Frederick L Lagman
(74) *Attorney, Agent, or Firm*—Young & Thompson

(57) ABSTRACT

An anti-flooding device with possible displacement of the waters for the exploitation of water energy includes a double closing system with an outer or inner cylindrical element with automatic, semi-automatic or manual operation, a pipe-line provided with an opening at the surface level which assures a constantly equal water level in the basin, and below which there are a plurality of pipes which come out above the surface for the air passage and for being guided to a float connected to a tubular sluice-gate that closes an opening on the bottom of the main pipe-line.

11 Claims, 4 Drawing Sheets

FIG. 6
FIG. 6'
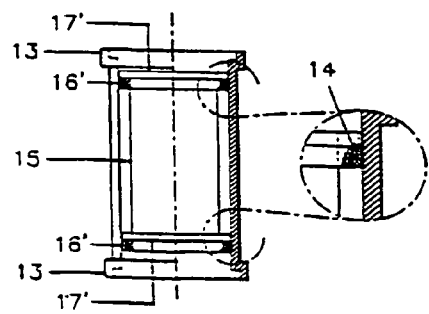
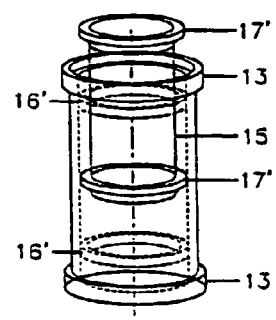
FIG. 7
FIG. 7'
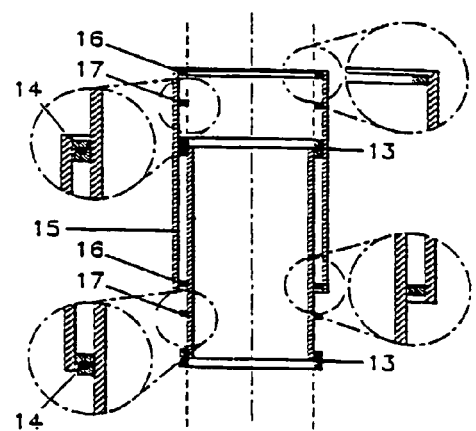
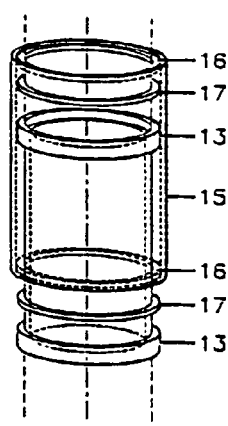
FIG. 8
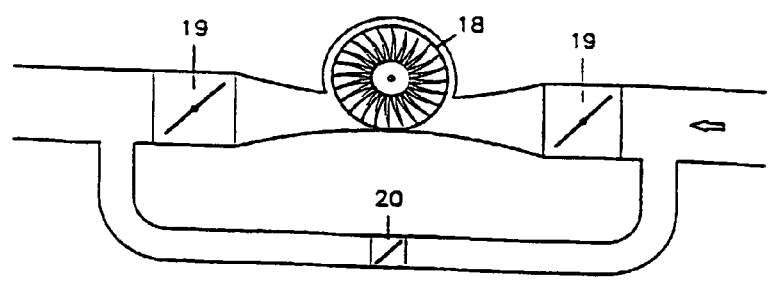

ANTI-FLOODING DEVICE FOR THE EXPLOITATION OF WATER ENERGY

BACKGROUND OF THE INVENTION

The present invention concerns an anti-flooding device with possible displacement of the waters for the exploitation of water energy, comprising a double closing system with an outer or inner cylindrical element, with automatic, semi-automatic or manual operation.

SUMMARY OF THE INVENTION

It is the aim of the present invention to provide for the discharge of water from water basins, rivers, channels and small pools and for its possible displacement from one basin to another one through pipe-lines, making use of the principle of the communicating vessels.

The device according to the present invention may be used, furthermore, for displacing water from one point to another one of the territory realizing tanks, collection basins for water and small watercraft centrals so as to obtain natural and local energy sources, avoiding the need of realizing the great systems known at present and which always cause ecological and environmental unbalance, and thus making use of resources which have never been considered before.

A further advantage of the device according to the present invention consists in its constructive easiness, which implies low costs in production and maintenance as well.

The device according to the present invention consists of a pipe-line provided, in its upper part, with an opening at the surface level which assures a constantly equal water level in the basin, and below which there are a plurality of pipes which come out above the surface for the air passage and for being guided to a float connected to a tubular sluice-gate that closes an opening realized on the bottom of the main pipe-line, which may be connected and functioning inside as well as outside of said structure, so that said sluice-gate allows the passage of water—in normal flow conditions—from the opening on the water surface while, in case of an excessive level increase and being connected to the float on the surface, the latter rises and operates the opening of said sluice-gate so that due to the pressure of the water as well as to the air inlets provided on the surface, a quick emptying of the basin may be realized until the basin itself or the course of the water is back to a safety level.

Above mentioned device may be operated manually, by means of levers or mechanic gears, or by electric motors with manual or automatic control by means of manistats for the control of the level, thus allowing adjusting the outlet flow of the waters.

Furthermore, the device according to the present invention shows a considerable functioning safety as the device is provided with two extractable filter nets, one on the surface and another one at the inlet below, which prevent the possible passage of heavy masses that could damage or obstruct the system and the mechanisms connected thereto.

The opening mechanism is provided as being connected to a float on the surface which, in case of lacking functioning due to breakdown of the mechanic components described above and with an increase of the water level, rises said sluice-guide so as to favour the outflow of the waters through the opening on the bottom, until the water level in the basin returns to its usual levels, thus preventing any kind of flooding. Furthermore, in case of damages, obstructions or servicing, a throttle-valve or of any other known kind, placed in the outlet pipe of the waters, blocks the water flows avoiding the forming of whirlpools, dangerous for operators.

BRIEF DESCRIPTION OF THE DRAWINGS

The present invention will be described more in detail hereinbelow relating to the enclosed drawings in which some embodiments are shown.

FIG. 8 shows an electric turbine for the exploitation of the water flow, placed at the outlet of the system, under the application of the Venturi effect.

DESCRIPTION OF THE PREFFERED EMBODIMENTS

Figure 1:
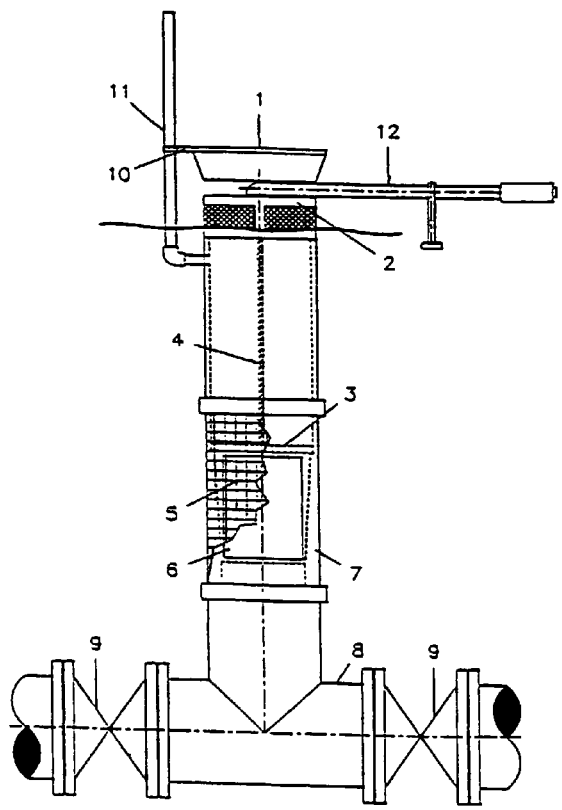
FIGS. 1, 2 and 3 show respectively the scheme of a device according to the present invention in its normal functioning condition, in emergency condition and in an axonometric and transparency view.
Figure 2:
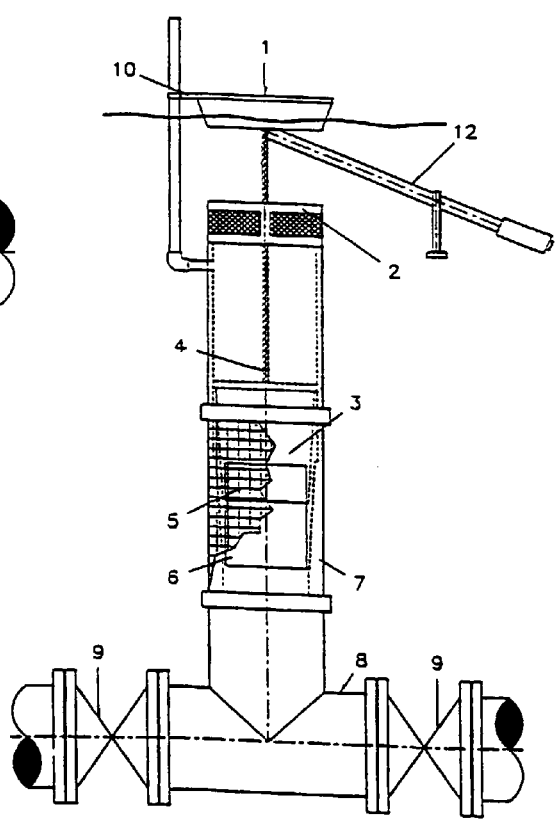
Figure 3:
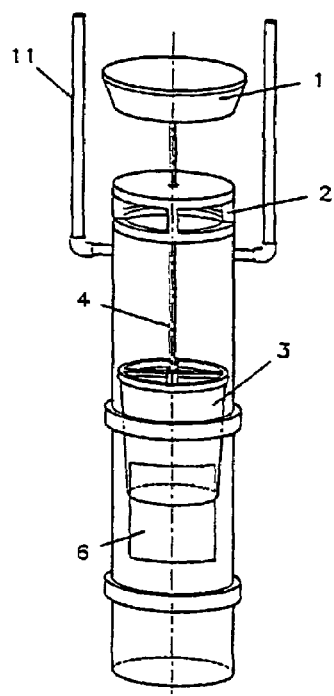

The enclosed figures and anti-flooding device with the displacement of the waters for the exploitation of water energy, comprising a double closing system with an inner or outer cylindrical element, with automatic, semi-automatic and manual operation, consisting of the following elements:

- a float 1;
- an inlet opening 2 in normal conditions, with a filtering net 5 and a central hole for the passage of the cable 4 for raising the closing element 3;
- a closing element 3 having the section of a truncated cone or a cylindrical section, with sealing gaskets;
- the cable (4) connecting said float 1 and said closing element 3;
- the extractable net 5 for filtering the flows and for protecting said device;
- an inlet opening 6 for emergency conditions, for quick discharge;
- a closing means 7;
- a pipe 8 for the water outflow;
- a plurality of valves 9 for closing the flows for servicing interventions;
- a plurality of rings 10 for fixing and sliding of the float;
- pipes 11 for air intakes and for the sliding of the float;
- a lever 12 for the manual opening.

Figure 4:
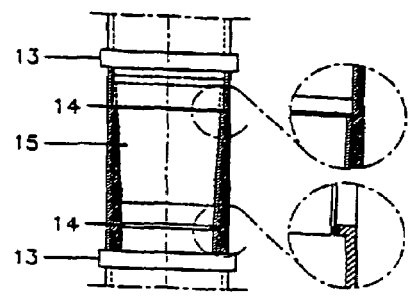
FIGS. 4, 4'; 5, 5'; 6, 6' and 7, 7' show, in lateral schemes and in axonometric transparency, some variants of the closing means.
Figure 4:
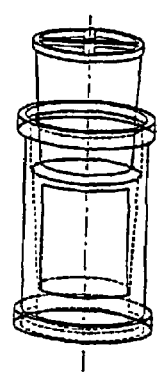

As far as the variant of the closing element shown in FIGS. 4, 4' is concerned, the pre-pressed or turned kind is put into evidence, suggested for small structures, the seat having the shape of a truncated cone and the sealing gaskets comprising:

- a ring 13 for the connection to the structure;
- sealing gaskets 14;
- a closing element 15 having a truncated cone shape.

Figure 5:
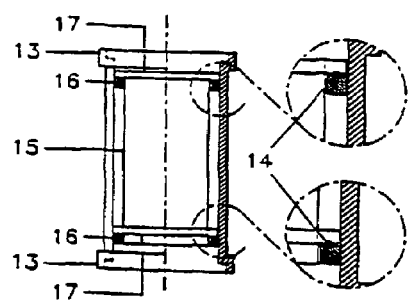
Figure 5:
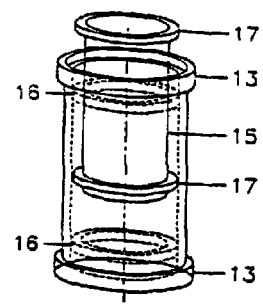

FIGS. 5, 5' show in detail a closing means with cylindrical adjustable rings, for realising systems of any dimension, applying the stop rings onto the fix element as well as onto the movable element by means of a threading for regulating the closing, comprising:

- rings 16 for keeping the fix element;
- rings 17 for keeping the movable element.

FIGS. 6, 6' show a closing means with conical adjustable rings, which is a variant of the precedent one with the difference that the keeping rings have a conical profile, while the variant shown in FIGS. 7, 7' shows a closing means with an external movable element sliding outside of the pipeline instead than inside.

FIGS. 8 shows the following details:
a turbine 18 connected to the electric generator;
valves 19 for closing the flow in case of servicing;
a valve 20 for opening/closing the by-pass.

Figure 9:
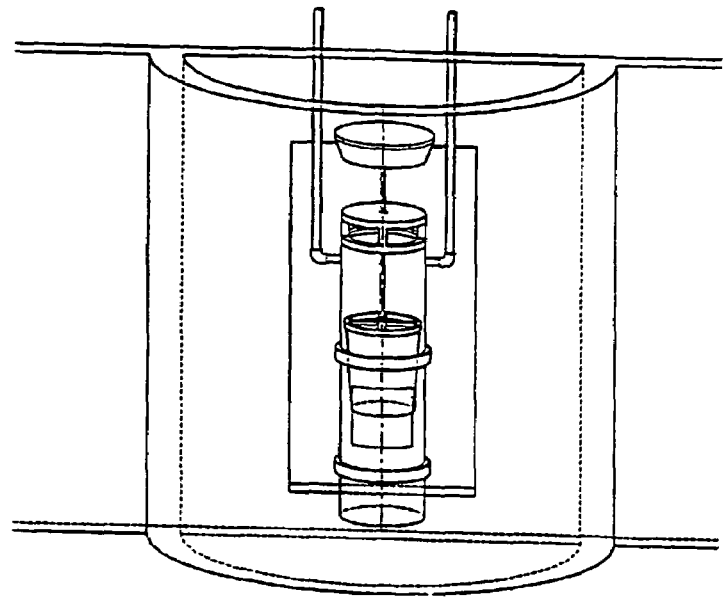
FIG. 9 shows the application of the device according to the present invention inside a basin obtained on the banks of a river and provided with an opening communicating with the course of the water which, due to the principle of the communicating vessels, keeps the same level.

FIG. 9 shows the device according to the present invention as applied in a basin on the bank of a river, provided with an opening communicating with the course of the water and being at the same level.

Figure 10:
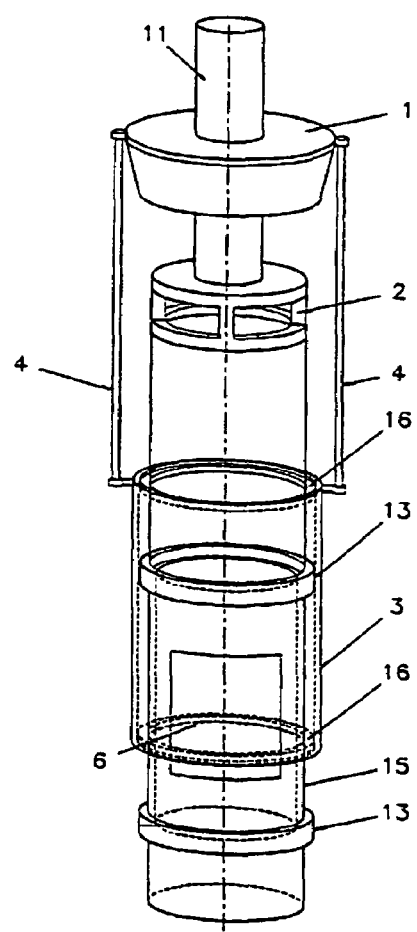
FIG. 10 shows in an axonometric and transparency view, a variant of the closing means as an outer movable element.

FIG. 10 shows a variant with a closing means with a movable external element, comprising:
a float 1;
an inlet opening 2 in normal conditions with a filtering net and a central hole for the air intake;
an outer cylindrical closing element 3, with sealing gaskets;
cables 4 for connecting the float and the closing element;
an inlet opening 6 in emergency conditions, for quick outflow;
a pipe 11 for the central air intake and for the sliding of the float;
a ring 13 for connecting the structure and the ring for keeping to the fix element;
an outer, movable closing element 15;
rings 16 for keeping the movable element.

The invention claimed is:

1. An anti-flooding device with displacement of the waters for the exploitation of the water energy, comprising:
   a pipeline having an upper opening (2) in an upper part of the pipeline and a lower opening (6) in a bottom of the pipeline, the upper opening for allowing an inflow of fluid from above the upper opening, the lower opening for allowing an outflow of the fluid via the lower opening;
   an extractable filtering net (5) for filtering the inflow of the fluid entering from the upper opening;
   a sluice-gate (3) that closes the lower opening (6), the sluice-gate having a section of one of a truncated cone and a cylinder;
   sealing gaskets for sealing the sluice-gate;
   a cable (4);
   a float (1) connected to the sluice-gate (3) by the cable (4) so that a rising operation of the float i) allows the inflow of the fluid into the pipeline via the upper opening (2) and ii) moves the sluice-gate to open the lower opening;
   an air pipe (11) having a first opening located above the upper opening (2) and a second opening located below the upper opening (2), the float sliding on the air pipe;
   a pipe (8) connected to the lower opening (6) and arranged to receive the outflow of the fluid;
   a plurality of valves (9) connected to the pipe (8) for closing the pipe (8) and preventing flow of the fluid;
   a plurality of rings (10) for fixing and sliding of the float (1); and
   a lever (12) for the manual rising of the float (1).

2. An anti-flooding device according to claim 1, wherein the sluice-gate (3) has the section of the truncated cone.

3. An anti-flooding device according to claim 1, wherein the sluice-gate further comprises cylindrical adjustable rings.

4. An anti-flooding device according to claim 1, wherein the sluice-gate further comprises conical adjustable rings.

5. An anti-flooding device according to claim 1, wherein the sluice-gate includes an outer movable element that slides outside of the pipeline.

6. An anti-flooding device according to claim 1, further comprising:
   an electric generator; and
   a turbine (18) connected to the electric generator for the exploitation of the outflow of the fluid.

7. An anti-flooding device according to claim 1, adapted for application inside a basin on the banks of a river.

8. An anti-flooding device according to claim 1, wherein the sluice-gate comprises an external movable element.

9. An anti-flooding device according to claim 1, configured for the exploitation of water energy by the outflow of the fluid.

10. An anti-flooding device according to claim 1, wherein the sluice-gate is tubular.

11. An anti-flooding device according to claim 1, wherein, the pipeline comprises a fixed part and a movable part, and the sluice-gate is regulated and closed by two threaded rings placed on the fix part and two threaded rings on the movable part.

* * * * *